J. BISHOP.
Stalk-Puller.

No. 433.
31,437.

Patented Feb. 19, 1861.

UNITED STATES PATENT OFFICE.

JOSIAH BISHOP, OF AUSTIN, TEXAS.

IMPROVEMENT IN MACHINES FOR EXTRACTING COTTON AND CORN STALKS.

Specification forming part of Letters Patent No. 31,437, dated February 19, 1861.

*To all whom it may concern:*

Be it known that I, JOSIAH BISHOP, of Austin, in the county of Travis and State of Texas, have invented a new and Improved Machine for Eradicating Cotton and Corn Stalks; and I do hereby declare that the following is a full, clear, and exact description of the same, reference being had to the annexed drawings, making a part of this specification, in which—

Figure 1:
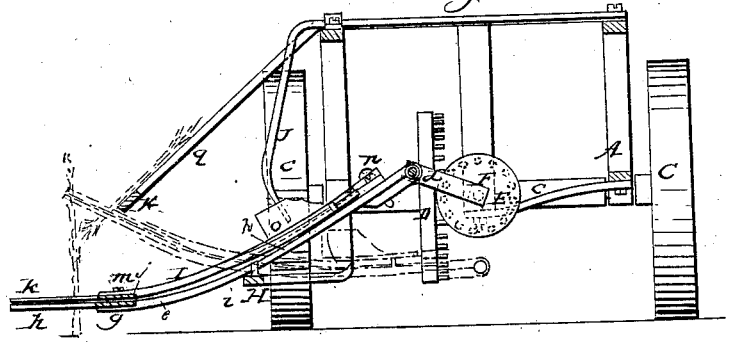
Figure 2:
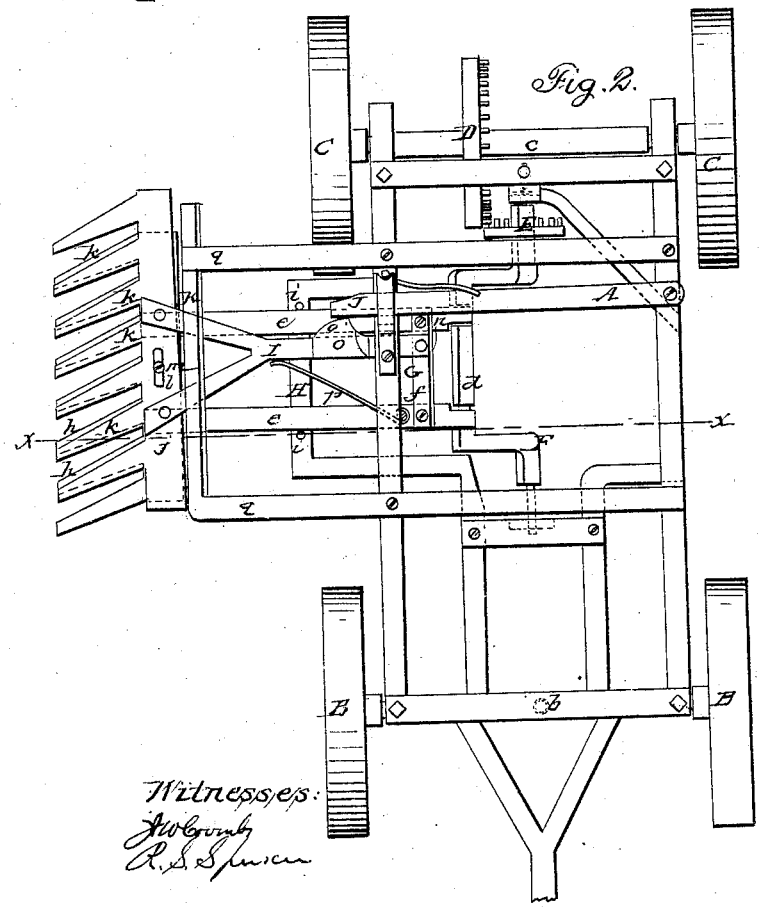

Figure 1 is a transverse vertical section of my invention, taken in the line *x x*, Fig. 2. Fig. 2 is a plan or top view of the same.

Similar letters of reference indicate corresponding parts in both figures.

The object of this invention is to obtain a simple and efficient machine for expeditiously eradicating or pulling up by the roots cotton and corn stalks, so as to render the soil free from stumps which are left by the usual process of cutting, and therefore capable of being expeditiously and properly prepared for a succeeding crop.

The invention consists in attaching a series of fingers to parallel bars which are connected to a mounted frame or wagon and so arranged as to have a forward-and-backward and also an up-and-down movement given it by the forward movement of the vehicle, by which operation the fingers are made to grasp the standing stalks and draw them out from the ground.

To enable those skilled in the art to fully understand and construct my invention, I will proceed to describe its construction and operation.

A represents a rectangular frame, which is mounted on wheels B B C C, the front wheels, B B, being attached to an axle, *a*, which is attached to the front part of the frame A by a king-bolt, *b*. On the axle *c* of the back wheels, C C, there is placed a toothed wheel, D, into which a pinion, E, gears, said pinion being at the back part of a crank-shaft, F, which is placed longitudinally in the frame A, as shown clearly in Fig. 2.

To the crank *d* of the shaft F there is attached a frame, G, which is composed of two parallel bars, *e e*, connected at their inner parts, near the crank, by a traverse-bar, *f*. To the front ends of the bars *e e* there is attached a bar, *g*, which has a series of fingers, *h*, attached to it obliquely. The frame G, it will be seen, projects from one side of the mounted frame A, and the fingers *h* point obliquely in a direction forward or toward the front part of the frame A, as shown clearly in Fig. 2. The bars *e e* of the frame G rest on a horizontal bar, H, which projects out from one side of the frame A, and has two vertical pins, *i i*, attached, between which the frame G works.

On the top of the finger-bar *g* there is placed a similar bar, *j*, also having fingers *k* attached to it. These fingers are precisely similar to the fingers *h* both in form and dimensions. The bar *j* has a slot, *l*, made in it longitudinally, and through this slot a screw, *m*, passes into the bar *g*. The bar *j* is attached to a bar, I, which is connected at its inner end to the traverse-bar *f* of the bars *e e* by a bolt, *n*. To the upper surface of the bar I there is attached a projection, *o*, which has one side, *o'*, made oblique and slightly rounded, as shown clearly in Fig. 2.

J is a bar which is slightly curved, and projects down from the right-hand side of the frame A and within the path of the movement of the projection *o*. Against one side of the bar I a spring, *p*, bears, said spring having a tendency to keep the fingers *k* of the bar *j* in register with the fingers *h* of the bar *g*.

K is a bar which is secured at the ends of two parallel bars, *q q*, which project in an inclined direction from the right-hand side of the frame A.

The operation of the machine is as follows: As the machine is drawn or propelled along by the side of a row of stalks the bars *e e* or the frame G are operated by the revolution of the crank *d*, and the fingers *h* have a forward-and-backward and also an upward-and-downward movement. The fingers *k* of the bar *j* also, of course, have a similar movement, and as the latter fingers approach the termination of their outward movement the oblique side *o'* of the projection *o* strikes the pendent arm J and causes the bar I to be moved so that the fingers *k* will open or be shoved out of register with the fingers *h* and the stalks, as the fingers move back, grasped by the action of spring *p* between the two sets of fingers *h k*, the stalks being pulled out of the ground as the fingers rise and pass backward in a direction toward the machine. The bar K discharges or scrapes the pulled stalks from between the fingers *h k* as the latter are drawn inward toward the machine, the fingers, while moving in the latter direction, being in contact with the under side of the bar K, as shown in red, Fig. 1. The frame G must have a sufficiently rapid movement, so that the fingers may grasp all the stalks as they pass along. This movement, of course, may be regulated by the relative size of the gearing D E.

The machine may be drawn by horses or propelled by steam, and when the machine is to be moved from place to place the crank-shaft F may be shoved forward, so that the pinion E will be free from the wheel D. This adjustment may be facilitated by any suitable lever attachment connected with shaft F.

I would remark that in some cases the movable fingers k may not be required, the fingers h being sufficient. The former may be dispensed with in cases where the stalks are not large, and where great power is consequently not required to draw the roots out of the ground.

Having thus described my invention, what I claim as new, and desire to secure by Letters Patent, is—

1. The fingers h k, either or both sets or series, when connected to a mounted frame, A, and operated by the draft movement of the same, substantially as shown, so as to have a backward-and-forward movement and also an upward-and-downward movement, for the purpose specified.

2. In combination with the fingers h k, either or both sets or series, the cleaning-bar K, arranged relatively with the fingers, to operate as and for the purpose specified.

JOSIAH BISHOP.

Witnesses:
N. C. RAYMOND,
FRANK R. BRICHTA.